US012584059B2

(12) United States Patent
Glaesman et al.

(10) Patent No.: US 12,584,059 B2
(45) Date of Patent: Mar. 24, 2026

(54) SEALING ELEMENT HAVING A POLYMER BLEND FOR SUBSURFACE CARBON SEQUESTRATION

(71) Applicant: Halliburton Energy Services, Inc., Houston, TX (US)

(72) Inventors: Chad W. Glaesman, Singapore (SG); Sandeep Thatathil, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 41 days.

(21) Appl. No.: 18/405,780

(22) Filed: Jan. 5, 2024

(65) Prior Publication Data

US 2025/0223487 A1     Jul. 10, 2025

(51) Int. Cl.
C09K 8/44          (2006.01)
E21B 41/00         (2006.01)
(52) U.S. Cl.
CPC ............ C09K 8/44 (2013.01); E21B 41/0064 (2013.01)
(58) Field of Classification Search
CPC ............................. C09K 8/44; E21B 41/0064
See application file for complete search history.

(56) References Cited

U.S. PATENT DOCUMENTS

2007/0193736 A1     8/2007     Corre et al.
2009/0283279 A1     11/2009    Patel et al.

2018/0265682 A1     9/2018     Roy et al.
2023/0228166 A1     7/2023     Glaesman et al.
2023/0265736 A1     8/2023     Stam et al.

FOREIGN PATENT DOCUMENTS

CA          3226655 A1 *     5/2023     ......... E21B 33/1208
CN          102061038        2/2013

OTHER PUBLICATIONS

"PCT Application No. PCT/US2024/010598 International Search Report and Written Opinion", Sep. 25, 2024, 10 pages.
Barbosa, et al., "Rheological Study of EPDM/Silicone Rubber Blends Phase Inversion and Characterization of Resultant Mechanical and Thermal Properties", Journal of Applied Polymer Science, Oct. 24, 2020, 10 pages.
Thirtha, et al., "Glass Transition Effects in Immiscible Polymer Blends", Antec, 2005, 6 pages.
V, "Development and Characterisation of EPDM/Silicone Rubber Nanocomposites for High Voltage Insulators", B.S.Abdur Rahman University (B.S. Abdur Rahman Institute of Science & Technology), 143 pages, Sep. 2013.

* cited by examiner

*Primary Examiner* — Kyle Armstrong
(74) *Attorney, Agent, or Firm* — DeLizio, Peacock, Lewin & Guerra LLP

(57)          ABSTRACT

An apparatus comprises a sealing element for a carbon sequestration in a location that is within a subsurface formation, wherein the sealing element is composed of a non-polar elastomer blended and co-cured with a low temperature elastomer having a glass transition temperature that is lower than a glass transition temperature of the non-polar elastomer.

14 Claims, 8 Drawing Sheets

Wellbore
102

Carbon
152

150

Cap
Rock
106

Subsurface
Formation
104

Carbon
Storage
108

Carbon
152

Carbon
152

Wellbore
102

Cap
Rock
106

Subsurface
Formation
104

Carbon
Storage
108

Sealing
Element
210

Carbon
152

Carbon
152

400

Properties of EPDM blends with increasing Silicone Loading

| Properties 402 | 100% EPDM (0phr) 404 | 95% EPDM-5% Silicone (5phr) 406 | 90% EPDM-10% Silicone (10phr) 408 | 80% EPDM-20% Silicone (20phr) 410 | 70% EPDM-30% Silicone (30phr) 412 | 0% EPDM-100% Silicone (100phr) 414 |
|---|---|---|---|---|---|---|
| Tensile at break (Tb) 422 | 1660 | 1592 | 1510 | 1330 | 1252 | 826 |
| Elongation at break (Eb) 424 | 255 | 272 | 266 | 256 | 234 | 42 |
| Tensile stress at 25% elongation (25M) 426 | 178 | 203 | 151 | 170 | 197 | 682 |
| Tensile stress at 50% elongation (50M) 428 | 262 | 260 | 218 | 240 | 286 | -- |
| Tensile stress at 100% elongation (100M) 430 | 506 | 416 | 394 | 419 | 499 | -- |

| Properties 502 | EPDM 504 | Silicone 506 | EPDM-Silicone Blend 508 |
|---|---|---|---|
| Low Temperature Sealing Properties Below -50°C 510 | Good | Excellent/ Very High | Very Good |
| High Temperature Performance 512 | Very Good | Excellent/ Very High | Excellent/ Very High |
| High Temperature Steam Exposure Resistance 514 | Excellent/ Very High | Very Good | Excellent/ Very High |
| High Pressure Sealing Performance 516 | Excellent/ Very High | Fair | Very Good |
| Oil Resistance 518 | Fair | Poor | Fair |
| Cost to Performance Value 520 | Excellent/ Very High | Very Good | Excellent/ Very High |

FIG. 5

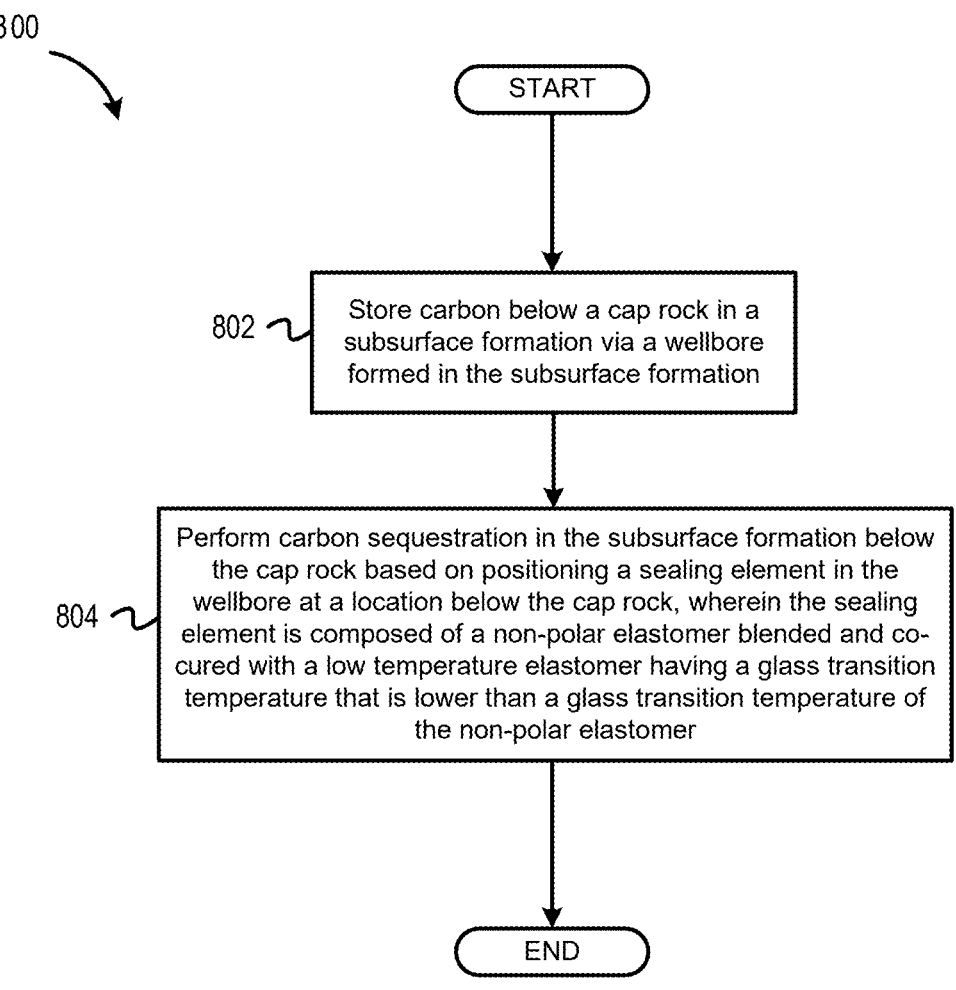

800

START

802 ～ Store carbon below a cap rock in a subsurface formation via a wellbore formed in the subsurface formation 804 ～ Perform carbon sequestration in the subsurface formation below the cap rock based on positioning a sealing element in the wellbore at a location below the cap rock, wherein the sealing element is composed of a non-polar elastomer blended and co-cured with a low temperature elastomer having a glass transition temperature that is lower than a glass transition temperature of the non-polar elastomer

END

FIG. 8

SEALING ELEMENT HAVING A POLYMER BLEND FOR SUBSURFACE CARBON SEQUESTRATION

BACKGROUND

Present range elastomers used in the hydrocarbon recovery industry may include Nitrile Butadiene Rubber (NBR), Hydrogenated Nitrile Butadiene Rubber (HNBR), Fluoroelastomer (FKM), Tetrafluoroethylene Propylene Modified Fluoroelastomer (FEPM), and Perfluoroelastomer (FFKM). However, such elastomers have limited low temperature service and especially in applications where adiabatic cooling may result in extreme low localized temperatures approaching −80° Celsius (C.). Such applications may include sealing connections in equipment for Carbon, Capture, Utilization, and Storage (CCUS) applications. CCUS environments typically have little to no hydrocarbon exposure which affords the opportunity to use non-polar elastomers for service. However even then, most of the common materials used in sealing applications have glass transition temperature ($T_g$) values of −60° C. or higher limiting their service at the extreme low temperature potentials in CCUS sealing applications.

BRIEF DESCRIPTION OF THE DRAWINGS

Embodiments of the disclosure may be better understood by referencing the accompanying drawings.

FIG. 4 is a table of properties of EPDM blends with increasing silicone loading, according to some embodiments.

FIG. 5 is a table of properties for different elastomer types, according to some embodiments.

FIG. 8 is a block diagram of a flowchart for performing subsurface carbon sequestration using a sealing element, according to some embodiments.

DESCRIPTION

Figure 1:
FIGS. 1-2 are perspective views (partially cross sectional) of an example well system for CCUS using a sealing element at two different stages, according to some embodiments.

The description that follows includes example systems, methods, techniques, and program flows that embody aspects of the disclosure. However, it is understood that this disclosure may be practiced without these specific details. In some instances, well-known instruction instances, protocols, structures, and techniques have not been shown in detail in order not to obfuscate the description.

Example implementations may be used to increase the low temperature sealing performance of common materials by introducing a silicone polymer into a compound without sacrificing the mechanical integrity of the sealing system. For example, some implementations may include sealing elements downhole in a wellbore after hydrocarbons have been extracted for carbon sequestration (such as CCUS applications). Example implementations may include sequestration in a subsurface formation that is below an impermeable cap rock so that the carbon does not diffuse back above the surface and into the atmosphere.

Because there is limited exposure to hydrocarbons in such situations, these sealing elements may include non-polar elastomers. Such sealing elements will not swell due to exposure to hydrocarbons because such downhole applications have little to no hydrocarbons downhole. Additionally, carbon dioxide is typically pumped downhole into the subsurface formation in a compressed state because the carbon dioxide is more efficient to pump in a compressed state. After being pumped downhole and released into the subsurface formation, the carbon dioxide may expand-changing to an uncompressed state. When decompressed, carbon dioxide acts like a refrigerant. Accordingly, there may be a significant drop in temperature at or near where the carbon dioxide is located. Therefore, the sealing elements used for carbon sequestration may need to account for such low temperatures.

Accordingly, example implementations may include a sealing element that is a blended polymer that includes a non-polar elastomer (such as Ethylene Propylene Diene Monomer (EPDM)) that has a structural strength for sufficient sealing for a high pressure CCUS application that is blended with a low temperature elastomer (such as silicone) to push the glass transition temperature of the blended polymer lower than the glass transition temperature of the non-polar elastomer. For example, some implementations may include a new elastomer compound which uses a continuous phase of compounded EPDM elastomer blended and co-cured with at least one of silicone, liquid silicone or fluro silicone rubber. Silicone is known for its exceptional low temperature flexibility but lacks sufficient strength and oil resistance for most oil and gas environments. In this polymer blend with EPDM, silicone may function as a non-extractable plasticizer/modifier that remains flexible and disrupts the crystallinity of the continuous and stronger phase of EPDM.

In some implementations, a low temperature elastomer (such as silicone with a Tg of −70° C. to −100° C.) may be used for blending with a non-polar elastomer since such an elastomer may be vulcanized by the same cure ingredients. In some implementations, the blend ratio of a low temperature elastomer to the non-polar elastomer may vary. For example, the blends may be 5:95 up to 40:60 silicone/fluro silicone to EPDM. This continuous phase of the blend may overcome the strength limitations of silicone while the silicone may add low temperature flexibility to the overall blend. However, a higher percentage of silicone may adversely affect the strength of blend. Accordingly, example implementations may include silicone and EPDM in a blended formation that have a synergistic relationship where each compensates for the specific weaknesses of the other to solve challenges specific to the low temperature service demands of CCUS applications.

Therefore, EPDM, Styrene-Butadiene Rubber (SBR), and Isobutylene Isoprene Rubber (IIR) rubbers are commodity type elastomers that may be compounded to have good mechanical strength making them useful for many industrial and consumer goods applications. Such synthetic rubbers or elastomers have reasonably good low temperature performance with elevated temperature performances sufficient to meet the most common demands of CCUS under their minimum temperature services. Silicone based elastomers are well known to have exceptionally good low temperature flexibility with silicone's major drawback being its limited strength. Silicone's use in applications with demanding mechanical loading or pressure extrusion resistance like those common in hydrocarbon recovery industry is limited. Blending of the two polymers balances the strength of the continuous phase polymer with the low temperature flexibility of the silicone rubber to produce a material both elastic at extreme low temperature and with sufficient strength to function as a seal against high differential pressures.

Thus, example implementations may expand the service envelope of seals for oil and gas equipment to meet the low temperature sealing demands of emerging energy markets. The new compound design (as described herein) is proposed for sealing materials for CCUS applications with extreme low temperature demands. In some implementations, blends of up to 40% silicone or liquid silicone rubber may be practical for use. In some implementations, NBR, HNBR, and/or Ethylene Copolymer Oligomer (ECO) may be used to improve hydrocarbon resistance but compatibilizers or fluorosilicone may be required to improve compatibly and co-curing.

Example System Application

Figure 2:

FIGS. 1-2 are perspective views (partially cross sectional) of an example well system for CCUS using a sealing element at two different stages, according to some embodiments. In particular, FIGS. 1-2 are schematic diagram of a well system 100. Previously, the well system 100 illustrated in FIGS. 1-2 may have included a service rig (e.g., a drilling rig, a completion rig, a workover rig, or other mast structure or combination thereof) extending over and around a wellbore 102 formed in a subsurface formation 104. Such a service rig may have been used to recover hydrocarbons from the subsurface formation 104. Accordingly, the subsurface formation 104 around and near the wellbore 102 may be depleted of some or most of the hydrocarbons. The wellbore 102 may be fully cased, partially cased, or an open hole wellbore. In this example, the subsurface formation 104 includes a cap rock section 106 and a section for carbon storage 108.

This wellbore 102 and the surrounding subsurface formation 104 may be repurposed for CCUS. For example, with reference to FIG. 1, carbon 152 (such as carbon dioxide) may be delivered from a carbon surface storage device 150 to the section of carbon storage 108 (below the cap rock section 106) via the wellbore 102. As shown in FIG. 2, after the carbon 152 is stored at locations in the carbon storage 108 below the cap rock section 106 of the subsurface formation 104, one or more sealing elements may be used as part of the CCUS. For example, a sealing element 210 may be positioned in the wellbore 102 to seal off the carbon 152 stored in the section of carbon storage 108. While depicted as a packer, the sealing element 210 may be any type of sealing element (such as an O-ring, a V-packing, a T-seal, a rotating control device element, a swell packer, a bonded expandable liner hanger, etc.

Example Sealing Elements

Example polymer blends for sealing elements used for downhole carbon sequestration are now described. In particular, these examples now described may be representative examples used for the sealing element 210 of FIG. 2. In some implementations, the sealing element may be composed of a non-polar elastomer blended and co-cured with a low temperature elastomer having a glass transition temperature that is lower than a glass transition temperature of the non-polar elastomer.

The non-polar elastomer may be a continuous phase polymer. For example, the non-polar elastomer may be Ethylene Propylene Diene Monomer (EPDM). In some implementations, the non-polar elastomer may be Styrene-Butadiene Rubber (SBR), Butadiene Rubber (BR), Isobutylene Isoprene Rubber (IIR), or Natural Rubber (NR).

In some implementations, the low temperature elastomer may be at least one of silicone or fluro-silicone. The glass transition temperature of the low temperature elastomer may be at or within different ranges. For example, the glass transition temperature of the low temperature elastomer may be at or lower than −50° Celsius (C.). In another example, the glass transition temperature of the low temperature elastomer may be in a range of −70° C. to −100° C.

Also, the polymer blend may be composed of different blends of the low temperature elastomer and the non-polar elastomer. For example, the sealing element may be composed of a polymer blend that comprises at least 5:95 of the low temperature elastomer to the non-polar elastomer. In another example, the sealing element may be composed of a polymer blend that comprises a blend in a range of 5:95 to 40.60 of the low temperature elastomer to the non-polar elastomer.

In some implementations, the sealing element may be composed of one or more additional elastomers. For example, the sealing element may be composed of an additional elastomer having a glass transition temperature that is less than −50° C. In some implementations, the additional elastomer may be Polybutadiene.

Accordingly, example implementations may include silicone and EPDM in a blended formation that have a synergistic relationship where each compensates for the specific weaknesses of the other to solve challenges specific to the low temperature service demands of CCUS applications. Therefore, EPDM, Styrene-Butadiene Rubber (SBR), and Isobutylene Isoprene Rubber (IIR) rubbers are commodity type elastomers that may be compounded to have good mechanical strength making them useful for many industrial and consumer goods applications. Such synthetic rubbers or elastomers have reasonably good low temperature performance with elevated temperature performances sufficient to meet the most common demands of CCUS under their minimum temperature services. Silicone based elastomers are well known to have exceptionally good low temperature flexibility with silicone's major drawback being its limited strength. Silicone's use in applications with demanding mechanical loading or pressure extrusion resistance like those common in hydrocarbon recovery industry is limited. Blending of the two polymers balances the strength of the continuous phase polymer with the low temperature flexibility of the silicone rubber to produce a material both elastic at extreme low temperature and with sufficient strength to function as a seal against high differential pressures.

Figure 3:
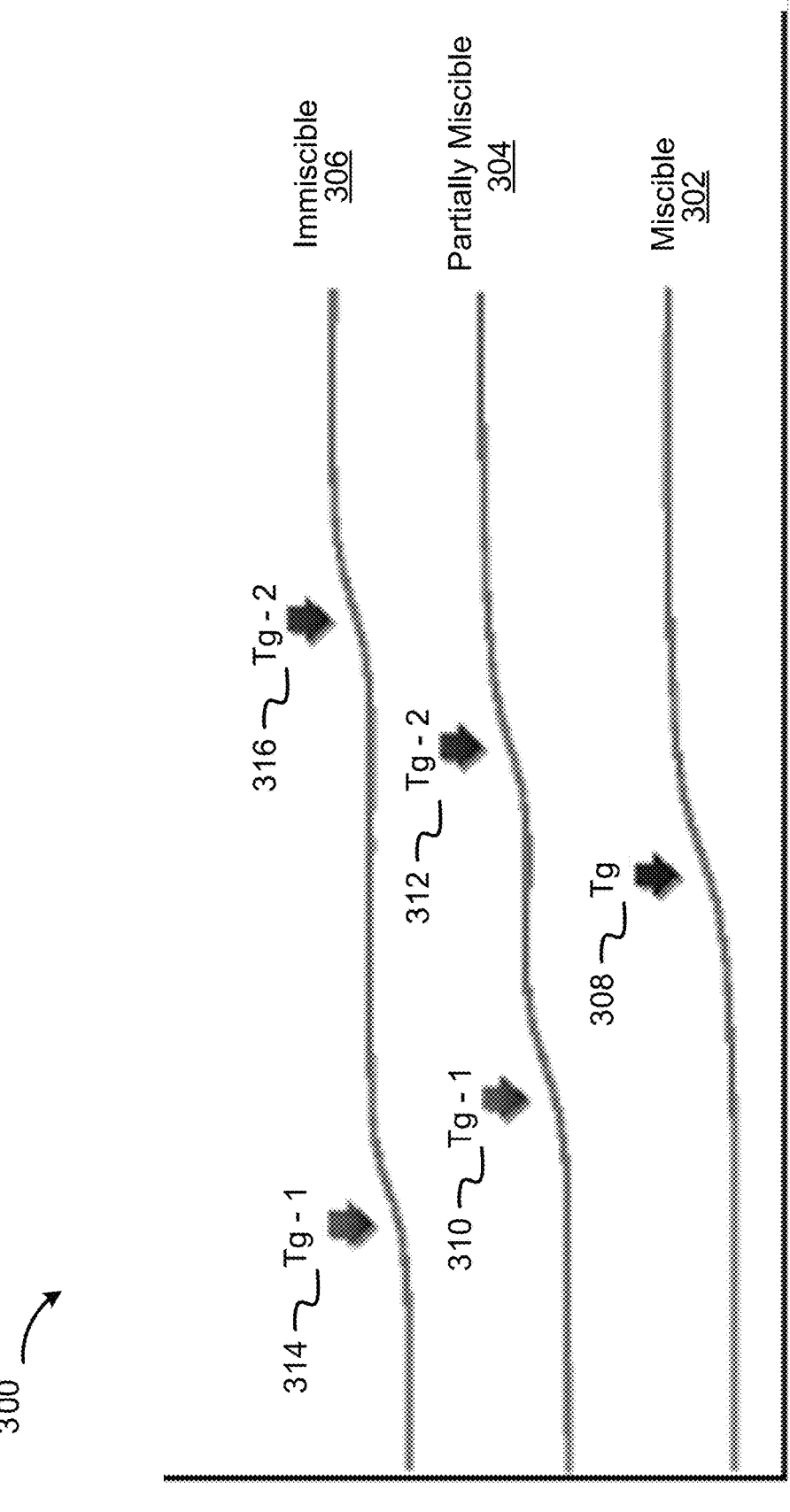
FIG. 3 is a graph of example glass transition temperature ($T_g$) values of a polymer blend of the sealing element that is miscible, partially miscible, and immiscible, according to some embodiments.

Additionally, the polymer blend of the sealing element may be miscible, partially miscible, or immiscible. To illustrate, FIG. 3 is a graph of example glass transition temperature ($T_g$) values of a polymer blend of the sealing element that is miscible, partially miscible, and immiscible, according to some embodiments. In FIG. 3, a graph 300 includes a plot 302 depicting a first example polymer blend that is miscible, a plot 304 depicting a second example polymer blend that is partially miscible, and a plot 306 depicting a third example polymer blend that is immiscible. As shown, the plot 302 for the first example polymer blend is miscible and therefore includes one $T_g$ value at point 308. The plot 304 for the second example polymer blend is partially miscible and therefore includes two $T_g$ values—one for each of the two polymers at points 310 and 312. The plot 306 for the third example polymer blend is immiscible and therefore includes two $T_g$ values—one for each of the two polymers at points 314 and 316.

Thus, as shown in FIG. 3, if two polymers don't blend well, there are two discrete phases. There may be one continuous phase of a larger amount of polymer and there are small disperses phases of the second polymer. This may result in two glass transition temperatures. However, if fully mixed, there will be one $T_g$ for the polymer blend that may be the weighted average of the two polymers being mixed together.

Thus, non-polar polymers blended with silicone may create miscible blends. The blending of miscible polymers may produce a single glass transition temperature $(T_g)$ which is the prorated average of the two constituents. Immiscible polymer blends will produce two distinct $T_g$ ranges as illustrated in FIG. 3. Blending of silicone rubber in some ratio with other non-polar polymers like EPDM will reduce $T_g$ of the main continuous phase polymer. Replacement of silicone rubber with fluorosilicone rubber may be performed for applications where some levels of oil resistance is required at the expense of low temperature.

To further illustrate example polymer blends for the sealing element, FIG. 4 is a table of properties of EPDM blends with increasing silicone loading, according to some embodiments. A table 400 of FIG. 4 includes a column 402 of properties of an example polymer blend, a column 404 of a polymer blend that is 100% EPDM (0 phr), a column 406 of a polymer blend that is 95% EPDM-5% silicone (5 phr), a column 408 of a polymer blend that is 90% EPDM-10% silicone (10 phr), a column 410 of a polymer blend that is 80% EPDM-20% silicone (20 phr), a column 412 of a polymer blend that is 70% EPDM-30% silicone (30 phr), and a column 414 of a polymer blend that is 0% EPDM-100% silicone (100 phr).

The table 400 also includes rows of different properties including a row 422 of tensile at break (Tb), a row 424 of elongation at break, a row 426 of tensile at 25% elongation (25M), a row 428 of tensile at 50% elongation (50M), and a row 430 of tensile at 100% elongation (100M). In this example, the tensile at break 422 for 0 phr, 5 phr, 10 phr, 20 phr, 30 phr, and 100 phr is 1660, 1592, 1510, 1330, 1252, and 826, respectively. The elongation at break 424 for 0 phr, 5 phr, 10 phr, 20 phr, 30 phr, and 100 phr is 255, 272, 266, 256, 234, and 42, respectively. The tensile stress at 25% elongation 426 for 0 phr, 5 phr, 10 phr, 20 phr, 30 phr, and 100 phr is 178, 203, 151, 170, 197, and 682, respectively. The tensile stress at 50% elongation 428 for 0 phr, 5 phr, 10 phr, 20 phr, 30 phr, and 100 phr is 262, 260, 218, 240, 286, and 0, respectively. The tensile stress at 100% elongation 430 for 0 phr, 5 phr, 10 phr, 20 phr, 30 phr, and 100 phr is 506, 416, 394, 419, 499, and 0, respectively.

FIG. 5 is a table of properties for different elastomer types, according to some embodiments. A table 500 of FIG. 5 includes a column 502 of properties of the three different elastomer types (EPDM, silicone, and EPDM-silicone blend) being compared. A column 504 includes EPDM 504. A column 506 includes silicone 506. A column 508 includes EPDM-silicone blend.

The table 500 also includes rows of different properties including a row 510 of low temperature sealing properties below −50° C., a row 512 of high temperature performance, a row 514 of high temperature steam exposure resistance, a row 516 of high pressure sealing performance, a row 518 of oil resistance, and a row 520 of cost to performance value.

In this example, low temperature sealing properties below −50° C. of EPDM 504, silicone 506, and EPDM-silicone blend 508 is good, excellent/very high, and very good, respectively.

High temperature performance of EPDM 504, silicone 506, and EPDM-silicone blend 508 are very good, excellent/very high, and excellent/very high, respectively. High temperature steam exposure resistance of EPDM 504, silicone 506, and EPDM-silicone blend 508 are excellent/very high, very good, and excellent/very high, respectively. High pressure sealing performance of EPDM 504, silicone 506, and EPDM-silicone blend 508 are excellent/very high, fair, and very good, respectively. Oil resistance of EPDM 504, silicone 506, and EPDM-silicone blend 508 are fair, poor, and fair, respectively. Cost to performance value of EPDM 504, silicone 506, and EPDM-silicone blend 508 are excellent/very high, very good, and excellent/very high, respectively.

Example Devices and Operations for Manufacturing a Sealing Element

Example devices and operations for manufacturing a sealing element are now described. The proposed polymer blends of EPDM and silicone or fluoro-silicone may be achieved through different manufacturing processes. The manufacturing process may include three different stages. Stage 1 may include the blending of the polymers. Stage 2 may include mixing of the polymer blend with the mixing additives. Stage 3 may include the vulcanization of this mixed compound. As further described below, Stages 1 and 2 may be performed by the example devices depicted in FIGS. 6A-6B. Stage 3 may be performed by the example device depicted in FIGS. 7A-7B.

Figures 6A, 6B:
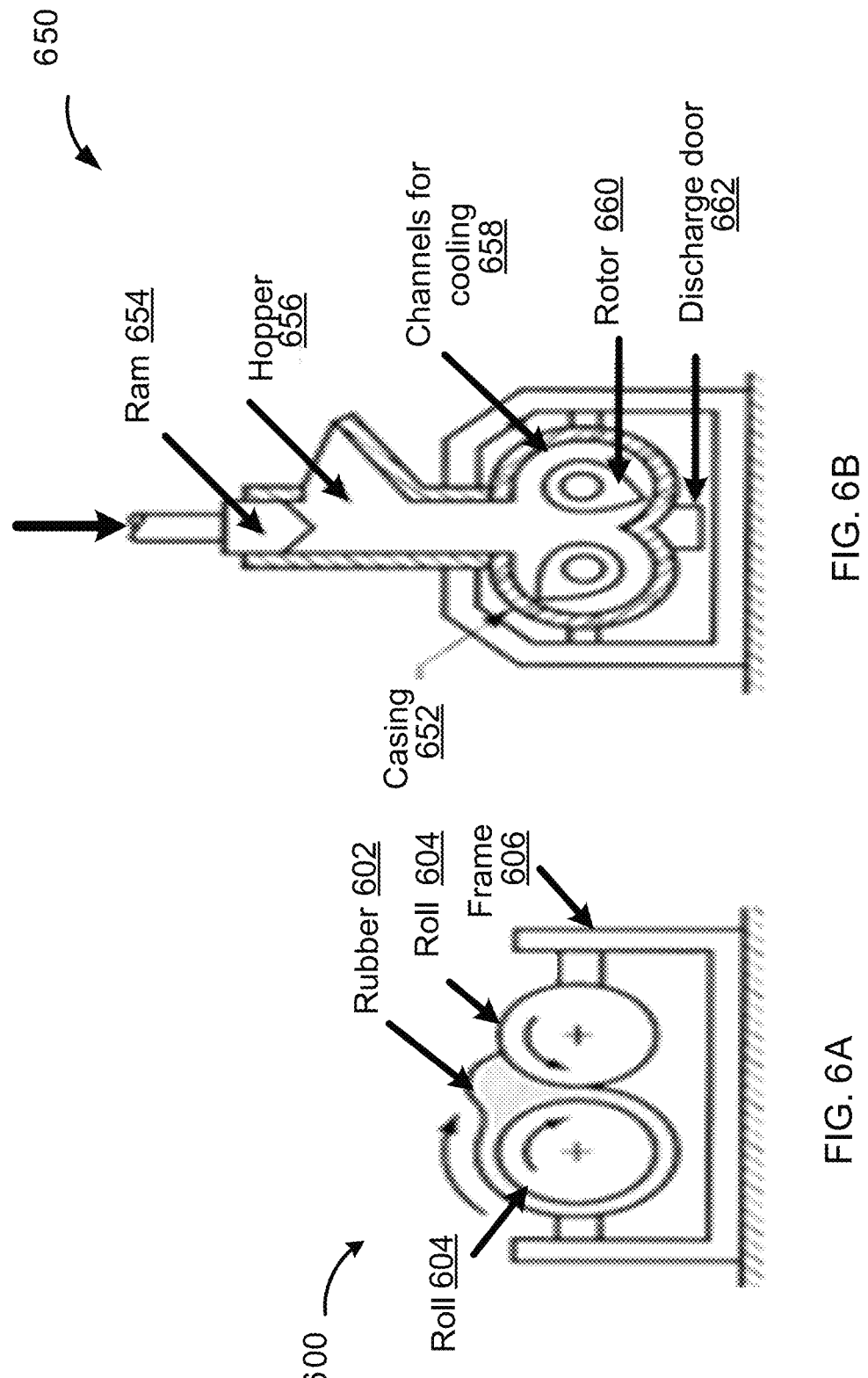
FIGS. 6A-6B are example devices for blending polymers at a first manufacturing stage or mixing a polymer blend with mixing additives at a second manufacturing stage, according to some embodiments.

The blending of the polymers may be done at the gum rubber stage using an internal mixer or using traditional two-roll mill. The process may masticate both elastomers and blend them together. To illustrate, FIGS. 6A-6B are example devices for blending polymers at a first manufacturing stage or mixing a polymer blend with mixing additives at a second manufacturing stage, according to some embodiments. FIG. 6A includes a device 600 that is a two-roll mill. The device 600 includes a frame 606 and rolls 604. The frame 606 may position the rolls 604 relative to each other so that as rubber 602 (which includes the two polymers (e.g., EPDM and silicone) is processed through the rolls 604 that the two polymers may be blended together to form a blended polymer. Internal mixing or a mill mixing process may be selected to keep the cost of the process within the standard materials. For pre-blending of elastomers, a brabender or extruders may also be used.

FIG. 6B includes a device 650 into which the blended polymer that is a result of the rubber 602 being processed by the device 600 is fed or input. In some implementations, the device 650 may be an internal mixer. The device 650 includes a ram 654, a hopper 656, a casing 652, channels for cooling 658, a rotor 660, and a discharge door 662. The blended polymer that was processed by the device 600 may be fed or input into the device 650 via the hopper 656. The ram 654 may move downward to force this blended polymer downward into the casing 652. The casing 652 may include the channels for cooling 658 and the rotor 660. As the ram 654 forces this blended polymer downward, the blended polymer is forced into the channels for cooling 658 of the casing 652. The cooled blended polymer is then output from the device 650 through the discharge door 662 with the assistance of the rotor 660. Stage 1 may include the blending of two main compounds and may also include fillers like carbon blacks, waxes and plasticizers.

Stage 2 may include the same or similar process/devices as the process/devices of Stage 1. For example, the same or same type of devices 600 and 650 may be used in Stage 2 for compounding ingredients including reinforcing filler and curatives added to the gum polymer through intermixing. Stage 2 may include mixing in vulcanizing agents. Having this separate second stage may prevent the precuring that may occur if this was done in one stage. Fillers and softeners may also be added to the EPDM to reduce the viscosity of the continuous EPDM phase to facilitate proper dispersion of the Silicone by making the viscosities of the two materials more similar.

Figure 7B:
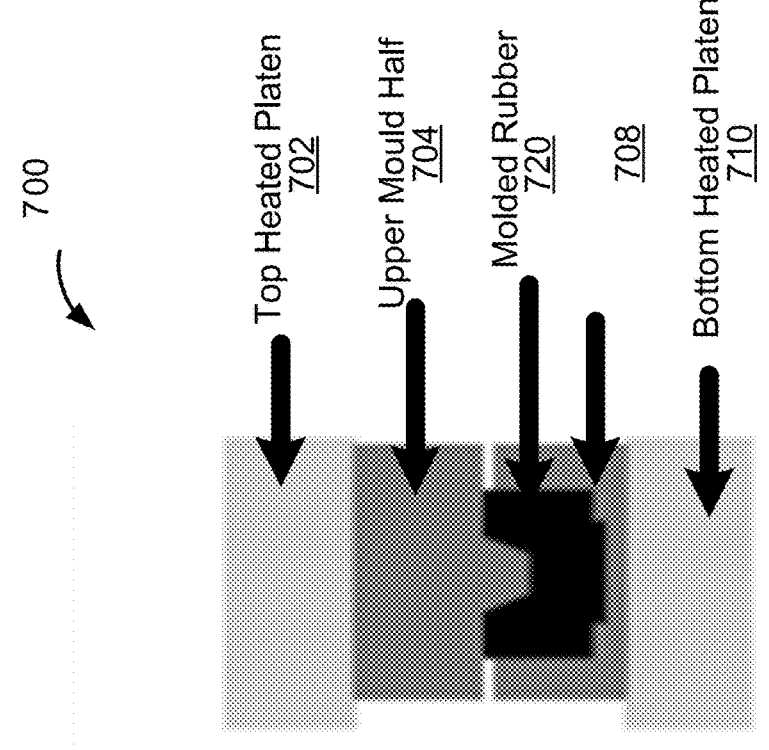
FIGS. 7A-7B is an example device for vulcanization of the mixed compound, according to some embodiments.
Figure 7A:
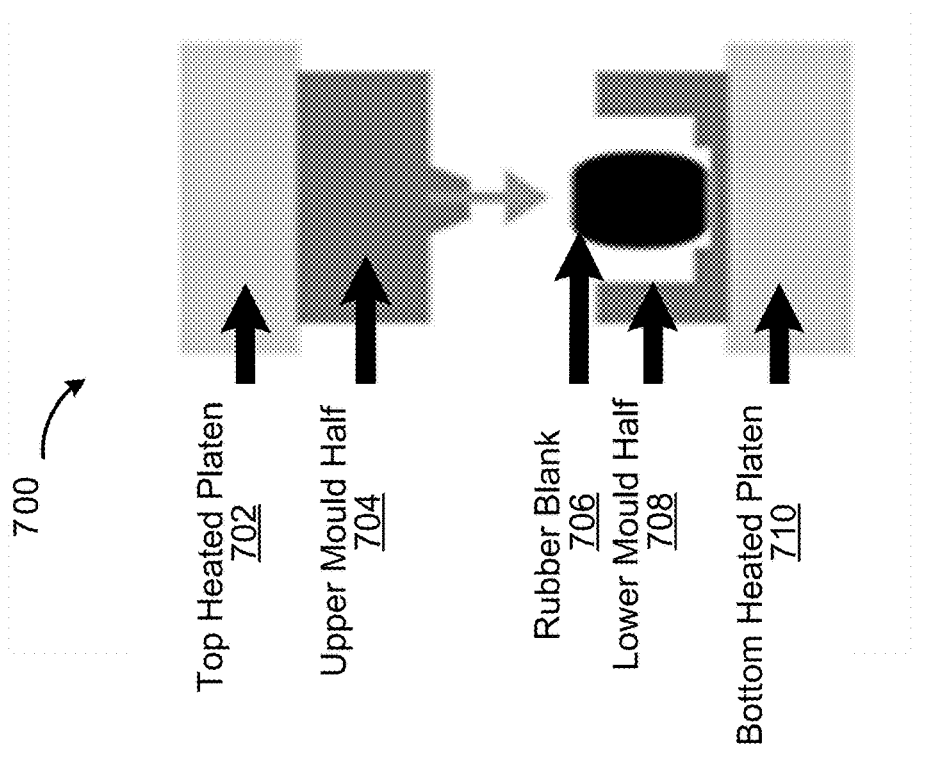

After stage 2, the manufacturing process may include stage 3 that comprises vulcanization of the mixed compound that includes the blended polymer. Such vulcanization may include compression or transfer molding. To illustrate, FIGS. 7A-7B is an example device for vulcanization of the mixed compound, according to some embodiments. FIGS. 7A-7B include a device 700 into which a rubber blank 706 is positioned. The device 700 includes a top heated platen 702, an upper mold half 704, a lower mold half 708, and a bottom heated platen 710. The rubber blank 706 is positioned between the upper mold half 704 and the lower mold half 708. FIG. 7A depicts the device 700 before the rubber blank 706 is pressed between the upper mold half 704 and the lower mold half 708. FIG. 7B depicts the device 700 such that the rubber blank 706 is pressed between the upper mold half 704 and the lower mold half 708 to create a molded rubber 720.

Additionally, final products may be produced through traditional elastomer manufacturing processes. These processes may include extrusion, calendaring, strip wrapping/roll building, and through injection, transfer, compression molding, etc. The products may be thin cross-sectional seals like O-rings, V-Packing, T-seals and bonded/molded seals or thicker cross-sectional seals like packing elements, rotating control device (RCD) elements, swell packers, and/bonded expandable liner hangers.

In some implementations, the low temperature properties of the polymer blend may be enhanced by adding a low Tg elastomer (such as polybutadiene). For example, an elastomer having a Tg of below −50° C. may be added to the polymer blend. In some implementations, the sealing element may be used in a location in the subsurface formation that includes residual hydrocarbons, produced water, etc. therein. In such implementations, the sealing element may include elastomers or polymers that help assistance with some level of oil resistance.

Example Operations

Example operations for performing subsurface carbon sequestration using a sealing element are now described. In particular, FIG. 8 is a block diagram of a flowchart for performing subsurface carbon sequestration using a sealing element, according to some embodiments. Operations of a flowchart 800 of FIG. 8 are described with reference to the system 100 of FIGS. 1-2. Operations of the flowchart 800 start at block 802.

At block 802, carbon is stored below a cap rock in a subsurface formation via a wellbore formed in the subsurface formation. For example, with reference to FIG. 1, carbon 152 may be delivered to the carbon storage 108 below the cap rock 106 in the subsurface formation via the wellbore 102.

At block 804, carbon sequestration is performed in the subsurface formation below the cap rock based on positioning a sealing element in the wellbore at a location below the cap rock. As described herein, the sealing element may be composed of a non-polar elastomer blended and co-cured with a low temperature elastomer having a glass transition temperature that is lower than a glass transition temperature of the non-polar elastomer. For example, with reference to FIG. 2, the sealing element 210 may be positioned in the wellbore below the cap rock 106 to sequester the carbon 152 in the subsurface formation 104. Operations of the flowchart 800 are complete.

While the aspects of the disclosure are described with reference to various implementations and exploitations, it will be understood that these aspects are illustrative and that the scope of the claims is not limited to them. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

EXAMPLE EMBODIMENTS

Example embodiments are now described.

Embodiment #1: An apparatus comprising: a sealing element for a carbon sequestration in a location that is within a subsurface formation, wherein the sealing element is composed of a non-polar elastomer blended and co-cured with a low temperature elastomer having a glass transition temperature that is lower than a glass transition temperature of the non-polar elastomer.

Embodiment #2: The apparatus of Embodiment #1, wherein the glass transition temperature of the low temperature elastomer is at or lower than −50° Celsius (C.).

Embodiment #3: The apparatus of any of Embodiments #1-2, wherein the low temperature elastomer has a glass transition temperature in a range of −70° Celsius (C.) to −100° C.

Embodiment #4: The apparatus of any of Embodiments #1-3, wherein the low temperature elastomer comprises at least one of silicone or fluro-silicone.

Embodiment #5: The apparatus of any of Embodiments #1-4, wherein the non-polar elastomer comprises a continuous phase polymer.

Embodiment #6: The apparatus of any of Embodiments #1-5, wherein the non-polar elastomer comprises Ethylene Propylene Diene Monomer (EPDM).

Embodiment #7: The apparatus of any of Embodiments #1-6, wherein the non-polar elastomer comprises Styrene-Butadiene Rubber (SBR), Butadiene Rubber (BR), Isobutylene Isoprene Rubber (IIR), or Natural Rubber (NR).

Embodiment #8: The apparatus of any of Embodiments #1-7, wherein the sealing element is also composed of an additional elastomer having a glass transition temperature that is less than −50° Celsius (C.).

Embodiment #9: The apparatus of Embodiment #8, wherein the additional elastomer comprises Polybutadiene.

Embodiment #10: The apparatus of any of Embodiments #1-9, wherein the sealing element is composed of a polymer blend comprises a blend of at least 5:95 of the low temperature elastomer to the non-polar elastomer.

Embodiment #11: The apparatus of any of Embodiments #1-10, the sealing element is composed of a polymer blend comprises a blend of in a range of 5:95 to 40.60 of the low temperature elastomer to the non-polar elastomer.

Embodiment #12: The apparatus of any of Embodiments #1-11, wherein the sealing element comprises at least one of an O-ring, V-packing, or a T-seal.

Embodiment #13: The apparatus of any of Embodiments #1-12, wherein the sealing element comprises at least one of a packing element, a rotating control device element, a swell packer, or a bonded expandable liner hanger.

Embodiment #14: A method comprising: storing carbon below a cap rock in a subsurface formation via a wellbore formed in the subsurface formation; and performing carbon sequestration in the subsurface formation below the cap rock based on positioning a sealing element in the wellbore at a location below the cap rock, wherein the sealing element is composed of a non-polar elastomer blended and co-cured with a low temperature elastomer having a glass transition temperature that is lower than a glass transition temperature of the non-polar elastomer.

Embodiment #15: The method of Embodiment #14, wherein the low temperature elastomer has a glass transition temperature in a range of −70° Celsius (C.) to −100° C.

Embodiment #16: The method of any of Embodiments #14-15, wherein the low temperature elastomer comprises at least one of silicone or fluro-silicone.

Embodiment #17: The method of any of Embodiments #14-16, wherein the non-polar elastomer comprises Ethylene Propylene Diene Monomer (EPDM).

Embodiment #18: The method of any of Embodiments #14-17, wherein the sealing element is composed of a polymer blend comprises a blend of at least 5:95 of the low temperature elastomer to the non-polar elastomer.

Embodiment #19: The method of any of Embodiments #14-18, wherein the sealing element is composed of a polymer blend comprises a blend of in a range of 5:95 to 40.60 of the low temperature elastomer to the non-polar elastomer.

Embodiment #20: The method of any of Embodiments #14-19, wherein the sealing element comprises at least one of an O-ring, a V-packing, a T-seal, a packing element, a rotating control device element, a swell packer, or a bonded expandable liner hanger.

The invention claimed is:

1. An apparatus comprising:
a sealing element for a carbon sequestration in a location that is within a subsurface formation, wherein the sealing element is composed of a non-polar elastomer blended and co-cured with a low temperature elastomer having a glass transition temperature that is lower than a glass transition temperature of the non-polar elastomer.

2. The apparatus of claim 1, wherein the glass transition temperature of the low temperature elastomer is at or lower than −50° Celsius (C).

3. The apparatus of claim 1, wherein the low temperature elastomer has a glass transition temperature in a range of −70° Celsius (C) to −100° C.

4. The apparatus of claim 1, wherein the low temperature elastomer comprises at least one of silicone or fluro-silicone.

5. The apparatus of claim 1, wherein the non-polar elastomer comprises a continuous phase polymer.

6. The apparatus of claim 1, wherein the non-polar elastomer comprises Ethylene Propylene Diene Monomer (EPDM).

7. The apparatus of claim 1, wherein the non-polar elastomer comprises Styrene-Butadiene Rubber (SBR), Butadiene Rubber (BR), Isobutylene Isoprene Rubber (IIR), or Natural Rubber (NR).

8. The apparatus of claim 1, wherein the sealing element is also composed of an additional elastomer having a glass transition temperature that is less than −50° Celsius (C).

9. The apparatus of claim 8, wherein the additional elastomer comprises Polybutadiene.

10. The apparatus of claim 1, wherein the sealing element is composed of a polymer blend comprises a blend of at least 5:95 of the low temperature elastomer to the non-polar elastomer.

11. The apparatus of claim 1, the sealing element is composed of a polymer blend comprises a blend of in a range of 5:95 to 40:60 of the low temperature elastomer to the non-polar elastomer.

12. The apparatus of claim 1, wherein the sealing element comprises at least one of an O-ring, V-packing, or a T-seal.

13. The apparatus of claim 1, wherein the sealing element comprises at least one of a packing element, a rotating control device element, a swell packer, or a bonded expandable liner hanger.

14. A method comprising:
storing carbon below a cap rock in a subsurface formation via a wellbore formed in the subsurface formation; and
performing carbon sequestration in the subsurface formation below the cap rock based on positioning a sealing element in the wellbore at a location below the cap rock, wherein the sealing element is composed of a non-polar elastomer blended and co-cured with a low temperature elastomer having a glass transition temperature that is lower than a glass transition temperature of the non-polar elastomer.

* * * * *